Patented Nov. 20, 1951

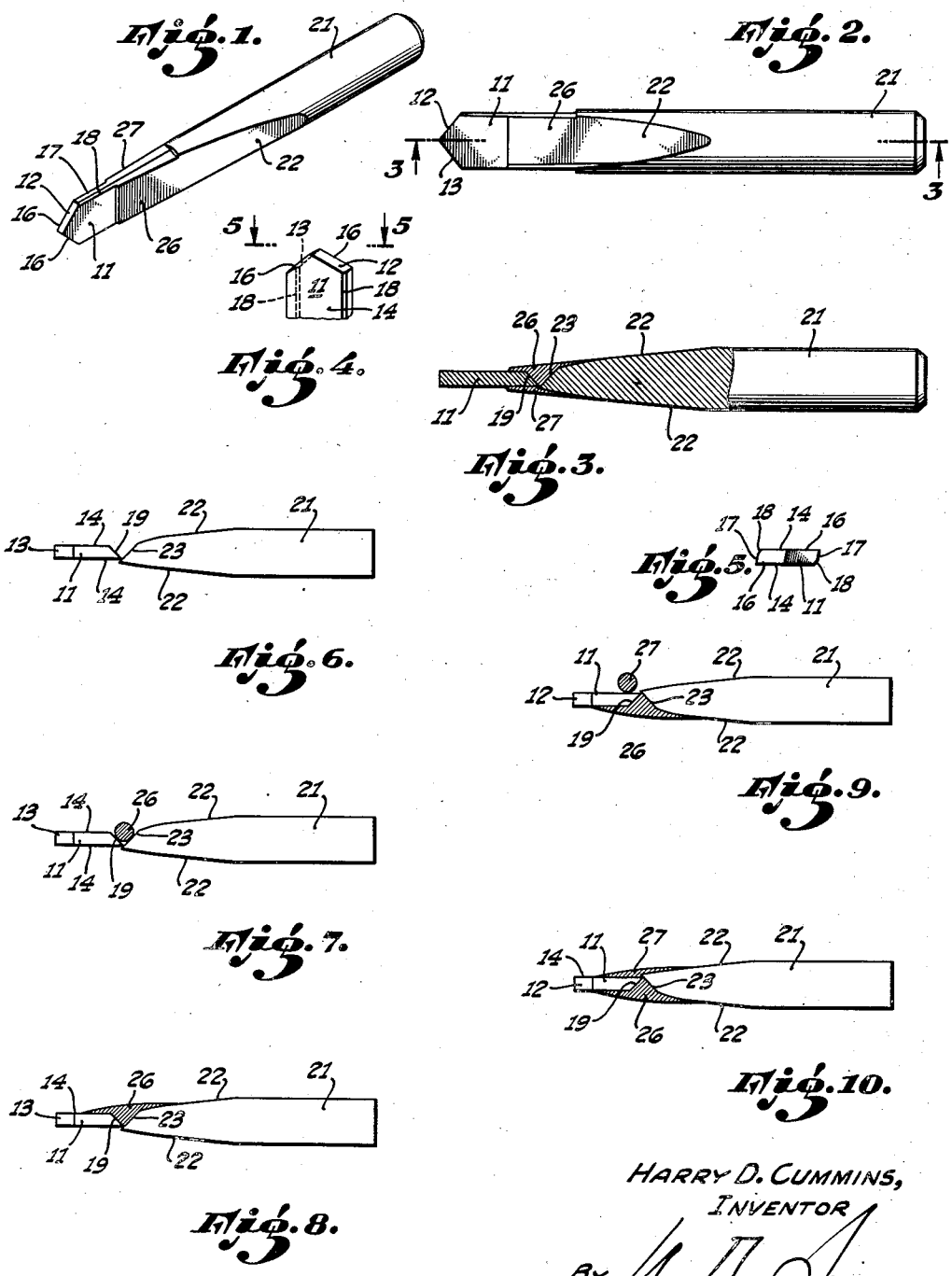

2,575,332

UNITED STATES PATENT OFFICE 2,575,332

DRILL

Harry D. Cummins, Pasadena, Calif., assignor, by mesne assignments, of sixty per cent to Thomas H. Coffey, La Crescenta, Calif., and forty per cent to William Douglas Sellers Application June 19, 1946, Serial No. 677,707

3 Claims. (Cl. 77—67)

The present invention relates to drills in general and particularly to a drill adapted for the making of holes in extremely hard metal. More specifically the invention comprises a drill for metal capable of cutting at speeds in excess of those heretofore known.

In the making of tools, machines and parts of metal, it is necessary and essential in certain operations to make apertures, holes, seats and bores in metal. In certain instances, the metal is extremely hard, a characteristic which varies with the heat treatment to which it has been subjected and with its chemical composition. Drills heretofore in use have been incapable of cutting certain metals at a reasonable cutting rate without exploding or breaking due to the strains set up and the heat generated. Also these drills did not have sufficient strength to enable them to cut extremely hard metals. Such drills were of the type formed with a shank cut out at the end to receive a tungsten steel insert secured in place by silver solder. In certain instances the cutting edge would be brazed in place, but at temperatures of 600° F., which would frequently be generated in the use of the tool, the bronze or brass of the braze would become granular and disintegrate. Such tools were incapable of cutting high carbon steels, high speed steels and their alloys.

With the recognition of these defects present in the prior art constructions, defects which often resulted in drills breaking and which always required the expenditure of considerable time and the use of coolants, the present invention is directed to an improved drill for metals.

It is an object of the invention to provide a metal cutting drill adapted to perform at cutting speeds in excess of those at which drills now in use are capable.

It is another object of the invention to provide a drill for substantially all commercially used metals with which clear water may be used as a coolant.

It is a further object of the invention to provide a new and improved method of making a superior metal cutting drill.

These and other more specific objects will appear upon reading the following specification and claims and upon considering in connection therewith the attached drawing to which they relate.

Referring now to the drawing in which a preferred embodiment of the invention is illustrated:

Figure 1 is a view in perspective of the drill constructed in accordance with the present invention;

Figure 2 is a top plan view of the drill illustrated in Figure 1;

Figure 3 is a partial longitudinal section upon the line 3—3 of Figure 2;

Figure 4 is a side view showing the cutting tip and the arrangement of its cutting edge;

Figure 5 is an end view of the cutting tip looking in the direction of the arrows upon the line 5—5 of Figure 4;

Figure 6 is a diagrammatic showing of the first step in the process of constructing a drill in accordance with the present invention;

Figure 7 is a diagrammatic showing of the second step of the process illustrating the initial positioning of the welding metal;

Figure 8 is a diagrammatic showing of the third step in the process showing a subsequent form assumed by the welding material; upon the temperature of the tip being raised to a predetermined point Figure 9 is a diagrammatic showing of the fourth step in the process showing the positioning of the welding metal upon the reverse side of the drill; and Figure 10 is a diagrammatic showing of the fifth step in the process and illustrates the relationship of tip, shank and welding material at the end of the welding operation.

Referring again to the drawing, a preferred form of drilling tool constructed in accordance with the present invention is illustrated and is seen to comprise a cutting tip 11 of tungsten carbide. The end of tip 11 is formed with two faces 12 and 13 which are angularly related and the planes of which intersect the planes of the side faces 14 of the tip at slightly less than a right angle to provide raised cutting edges 16 upon opposite sides of the tip. The element is adapted to rotate in one direction with the edges 16 leading and to prevent any possible binding the edges 17 are inclined from the perpendicular relative to flat sides 14 and are bevelled off at 18 along their trailing corners. The inner end 19 of tip 11 is inclined to make an angle of substantially 45° with the side faces 14 for a reason which will be described. The angular relationship of the sides and edges of the tip are best shown in Figures 4 and 5, the angularity of lower end 19 being shown in several figures including Figure 3.

The tip is welded to a shank 21 which is preferably of a high grade carbon steel cylindrical in section at its outer end so as to be adapted to seat in the chuck of a drilling machine. Opposed sides of the shank are shaped, as by grinding, to form converging side walls 22 which are joined by an outer angularly extending end 23 which intersects a medial longitudinal plane through the shank at an angle of about 45°, as illustrated clearly in Figure 3. The sloping ends 19 and 23 of the tip and shank, respectively, abut or substantially abut each other in a manner clearly shown in Figure 3 in the finished product, the longitudinal axis of the tip and the shank being coincident.

The steps of the operation of joining tip 11 to shank 21 by welding are illustrated diagrammatically in Figures 6 to 10, inclusive. The tip 11 is brought into juxtaposition to shank 21 as shown in Figure 6, and the temperature of the parts raised, as by an oxy-acetylene torch applied to the tip, until it approaches a temperature of about 2800° F. At this time at the junction of the tip and the shank a body 26 of the welding metal is deposited which may be Monel metal having the following composition: 67% nickel, 28% copper, 5% iron, manganese and silicon combined. Metal having the following composition may also be used: 67% nickel, 30% copper, 1.4% iron, 0.14% manganese, 0.1% sulphur, 0.1% silicon, 1.0% silver and 0.26% carbon. This welding metal is dropped at the junction of the tip end of the shank, as illustrated in Figure 7. The temperature of the parts is increased until it reaches approximately 2800° F., at which time the body or ball 26 of welding material flows over the tip and the shank, completely filling the crevice or scarf therebetween to assume a position as illustrated in Figure 8. The withdrawal of the heat permits the parts to cool and the welding metal forming a welded bond between the shank and the tip. The same operation is then performed upon the opposite side of the tool as illustrated in Figures 9 and 10, the welding material there being indicated by the reference character 27. The intersecting planes of the ends 19 and 23 of the tip and the shank together with the sloping walls 22 of the shank and the flat tip walls 14 provide a plurality of angularly related welded surfaces lying in a plurality of planes to resist stresses which may be provided by forces in any direction. It is interesting to note that in the welding of the second side the weld metal is not displaced from the side first welded. This apparently is due to an affinity which exists after the welding operation has been performed.

The tool is completed by grinding so as to flatten the welds 26 and 27 as to give them the contours illustrated in Figures 1, 2, and 3, in which they are seen to form substantially flat continuations of the converging walls 22 of the shank to a point on the tip 11 forward of its sloping end wall 19.

In its final form the cutting tip 11 and the shank 21 form an integral unitary construction as distinguished from metal-cutting drills heretofore used in which the cutting element was secured to the shank in a relatively insecure manner and was subject to breakage under unexpected stresses and to disrupting explosive forces caused by excessive heat.

In operation the tool constructed in accordance with the present invention is adapted to have its cylindrical shank 21 seated in the chuck of a drilling machine and to be rotated in a direction to advance its cutting edges 16 into the work. The angularity of the cutting end is such that there is a minimum of binding action resulting from chips and the tool is sufficiently strong as to permit the use of clear water as a coolant instead of the expensive coolants now used in drilling operations in hard metals. The use of the particular welding material described has been found to be most effective and to provide a superior construction and one in which the junction of the tip and shank does not form a weak link which must be protected by careful use as in structures heretofore known. As a matter of fact it has been found that the drills will withstand a temperature higher than the melting point of the welding metal itself. This apparently is due to some reaction which takes place in the welding metal from its close association with the tungsten carbide or from its contact with the gas given off by it at the high welding temperature. It is true to say that this drill is capable of cutting any metal which is known to be used commercially and in all instances in which other drills can be used the present drill will cut at a greater rate of speed. In fact the present drill can be used to drill holes through any high speed drill or tool bit now known.

While the particular apparatus and method herein shown and described in detail are fully capable of attaining the objects and providing the advantages hereinbefore stated, it is to be understood that they are merely illustrative of the presently preferred embodiments of the invention and that no limitations are intended as to the details other than as defined in the appended claims.

I claim:

1. A drill comprising a steel shank and a metal-cutting tip of tungsten carbide, said shank and said tip being longitudinally aligned and formed with sloping abutting inner ends making single line contact, and metal reinforcements upon the opposite sides of said line of contact securing said shank and tip in welded relationship, said metal including 67% nickel, 28% copper, approximately, and minor percentages of iron, manganese and silicon.

2. A metal cutting tool comprising a steel supporting body, a tungsten carbide cutting element adjacent said body and a Monel metal connection between the body and said cutting element welded to each, the steel supporting body and the tungsten carbide cutting element being beveled adjacent their ends and arranged axially in substantially abutting single line contact, and the connecting Monel metal being bonded to both the body and the cutting element for a substantial distance on both sides of the single line of contact and substantially filling the beveled portions.

3. A drill comprising an elongated steel shank and a metal cutting tip of tungsten carbide, arranged in longitudinal alignment in substantially abutting relation, each abutting end being beveled to provide a single line contact between the tip and shank, and Monel metal reinforcements on opposite sides of said line of contact filling the beveled portions and being bonded to both said tip and shank.

HARRY D. CUMMINS.

REFERENCES CITED

The following references are of record in the file of this patent:

UNITED STATES PATENTS

| Number | Name | Date |
|---|---|---|
| 1,826,085 | Mulock | Oct. 6, 1931 |
| 1,847,302 | Emmons | Mar. 1, 1932 |
| 1,859,978 | Metzger | May 24, 1932 |
| 1,901,654 | Kerr | Mar. 14, 1933 |
| 1,908,887 | Breeler et al. | May 16, 1933 |
| 1,927,818 | Brodersen | Sept. 26, 1933 |
| 2,089,481 | Howard | Aug. 10, 1937 |
| 2,325,535 | Nordberg | July 27, 1943 |
| 2,337,322 | Gascoigne | Dec. 21, 1943 |
| 2,346,546 | Anderson | Apr. 11, 1944 |
| 2,418,021 | Fleischer | Mar. 25, 1947 |